(12) United States Patent
Wietharn

(10) Patent No.: US 7,201,367 B2
(45) Date of Patent: Apr. 10, 2007

(54) LOAD-BEARING RESILIENT MOUNT

(75) Inventor: Ross Paul Wietharn, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 482 days.

(21) Appl. No.: 10/317,211

(22) Filed: Dec. 12, 2002

(65) Prior Publication Data

US 2004/0113338 A1    Jun. 17, 2004

(51) Int. Cl.
*F16F 7/00*    (2006.01)

(52) U.S. Cl. .................... 267/141; 267/141.4; 267/294

(58) Field of Classification Search ............. 267/141.1, 267/141, 141.3, 141.4, 141.5, 140.11, 140.12, 267/140.13, 140.4, 292, 293, 294, 136, 159, 267/160, 161, 162, 164; 248/636, 638
See application file for complete search history.

(56) References Cited

U.S. PATENT DOCUMENTS

| | | | |
|---|---|---|---|
| 3,519,096 A * | 7/1970 | Lunzer | ........................ 177/225 |
| 3,575,403 A | 4/1971 | S. Mande | |
| 3,669,469 A | 6/1972 | Hartelius | |
| 4,192,528 A | 3/1980 | Bergquist | |
| 4,324,417 A | 4/1982 | Johansson | |
| 4,416,203 A | 11/1983 | Sherrick | |
| 4,615,513 A | 10/1986 | Thaung et al. | |
| 4,651,978 A | 3/1987 | Grafström | |
| 4,968,010 A | 11/1990 | Odobasic | |
| 5,676,356 A | 10/1997 | Ekonen et al. | |
| 6,017,073 A | 1/2000 | Lindblom et al. | |
| 6,030,017 A | 2/2000 | Stojkovic et al. | |
| 6,241,223 B1 | 6/2001 | Gugsch et al. | |
| 6,443,439 B1 | 9/2002 | Newman | |
| 6,511,037 B1 | 1/2003 | Newman | |

FOREIGN PATENT DOCUMENTS

| WO | WO94/01695 | 1/1994 |
|---|---|---|
| WO | WO00/23722 | 4/2000 |

OTHER PUBLICATIONS http://www.mmt-gmbh.de/e/index.htm—Gummi Metall Technik GmbH; downloaded Nov. 6, 2002.
http://www.trelleborg.com/industrialavs/template/T005.asp?id=514&lang=2—Trellborg Product Range; downloaded Oct. 30, 2002.

* cited by examiner

*Primary Examiner*—Pam Rodriguez
(74) *Attorney, Agent, or Firm*—Finnegan, Henderson, Farabow, Garrett & Dunner

(57) ABSTRACT

A resilient mount including a first mounting member and a second mounting member is provided. The mount may include a first plurality of stiffening elements located between the first and second mounting members. At least a first stiffening element may be non-parallel to a second stiffening element. The mount may also include a resilient material located between and coupled to adjacent stiffening elements of the first plurality of stiffening elements.

8 Claims, 3 Drawing Sheets

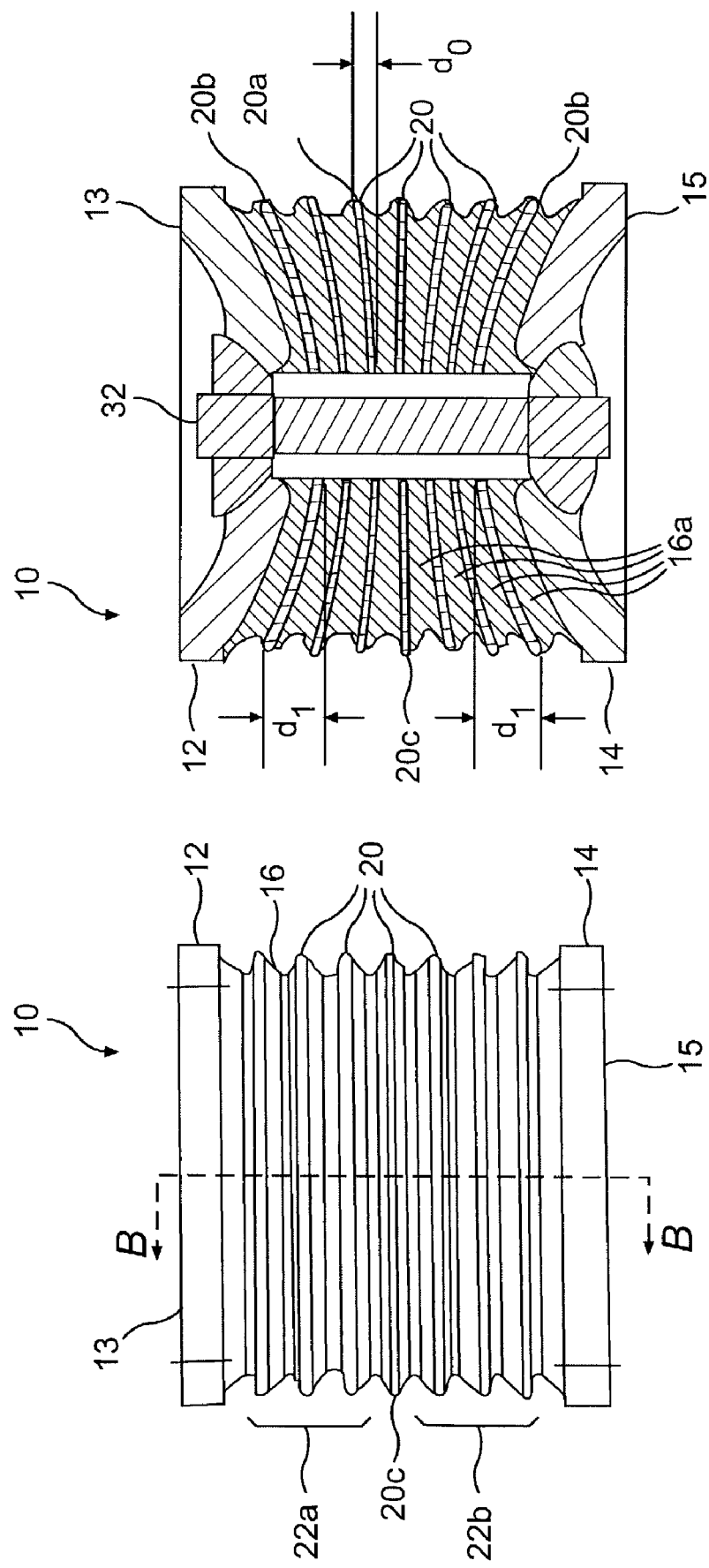

LOAD-BEARING RESILIENT MOUNT

TECHNICAL FIELD

This invention relates generally to a mount, and, more particularly, to a resilient mount capable of carrying loads while its mounting surfaces move relative to one another.

BACKGROUND

Mountings with both load bearing and deflection capabilities have been used in the suspension systems of vehicles for many years. In some applications, load bearing suspension mounts, such as elastomeric mounts, are positioned between two vehicle components. These elastomeric mounts are designed to carry compressive and tensile loads, while at the same time allowing the two vehicle components to translate and tilt relative to one another. Typically, an elastomeric mount includes a pad of an elastomeric material, for example, rubber, sandwiched between two mounting plates. The mounting plates are generally positioned between the axle and the vehicle frame such that movement of the axle relative to the payload frame is allowed while static and dynamic loads are transmitted. This type of load-bearing suspension mount may be used, for example, in articulated trucks of the type used at off-road construction sites.

Known elastomeric load-bearing suspension mounts are disclosed in U.S. Pat. No. 6,443,439, issued Sep. 3, 2002 and in a GMT GmbH, "special elements" product catalog, for instance, item numbers 613003 and 139017. These suspension mounts have a series of parallel elements embedded in an elastomeric material and positioned between two rigid end members. The parallel elements increase the stiffness and load carrying capability of the mount as compared to a purely elastomeric mount by reducing the bulging of the elastomeric material in compression and the necking of the elastomeric material in tension. Thus, these elastomeric mounts may adequately carry pure compressive or tensile loads when the rigid end members are moved towards or away from each other. However, they are prone to premature failure in the highly stressed elastomeric material when the rigid end members are tilted (i.e., rotated out of parallel) with respect to one another. Premature failure of the elastomeric material or of the bond of the elastomeric material to the embedded parallel elements could result in the need to frequently replace these load-bearing suspension mounts. Replacement is typically difficult, time-consuming, and expensive.

In the suspension industry, particularly with respect to articulated truck suspensions, a robust, maintenance-free, load-bearing mount that has sufficient stiffness to transmit large compressive and tensile loads and sufficient flexibility to accommodate the mounting surfaces translating and tilting relative to one another may be beneficial. The present invention is directed to overcoming one or more of the problems or disadvantages associated with the prior art.

SUMMARY OF THE INVENTION

In one aspect of the invention, a resilient mount including a first mounting member and a second mounting member is provided. The mount may include a first plurality of stiffening elements located between the first and second mounting members. At least a first stiffening element may be non-parallel to a second stiffening element. The mount may also include a resilient material located between and coupled to adjacent stiffening elements of the first plurality of stiffening elements.

In another aspect of the invention, a resilient mount is provided. The mount may include a first mounting member and a second mounting member. A resilient material may be coupled to the first and second mounting members. The mount further may include a first plurality of non-planar elements. Each non-planar element may be at least partially embedded within the resilient material and may have an out-of-plane dimension, and at least a first of the non-planar elements may be non-parallel to a second of the non-planar elements.

BRIEF DESCRIPTION OF THE DRAWINGS

The accompanying drawings, which are incorporated in and constitute a part of this specification, illustrate exemplary embodiments of the invention and together with the description, serve to explain the principles of the invention.

FIG. 1b is a cross-sectional view, through cut A—A, of the exemplary embodiment of FIG. 1a;

FIG. 2a is a side view of another exemplary embodiment of a resilient mount in accordance with the invention;

FIG. 2b is a cross-sectional view, through cut B—B of the exemplary embodiment of FIG. 2a.

DETAILED DESCRIPTION

Figure 1A:
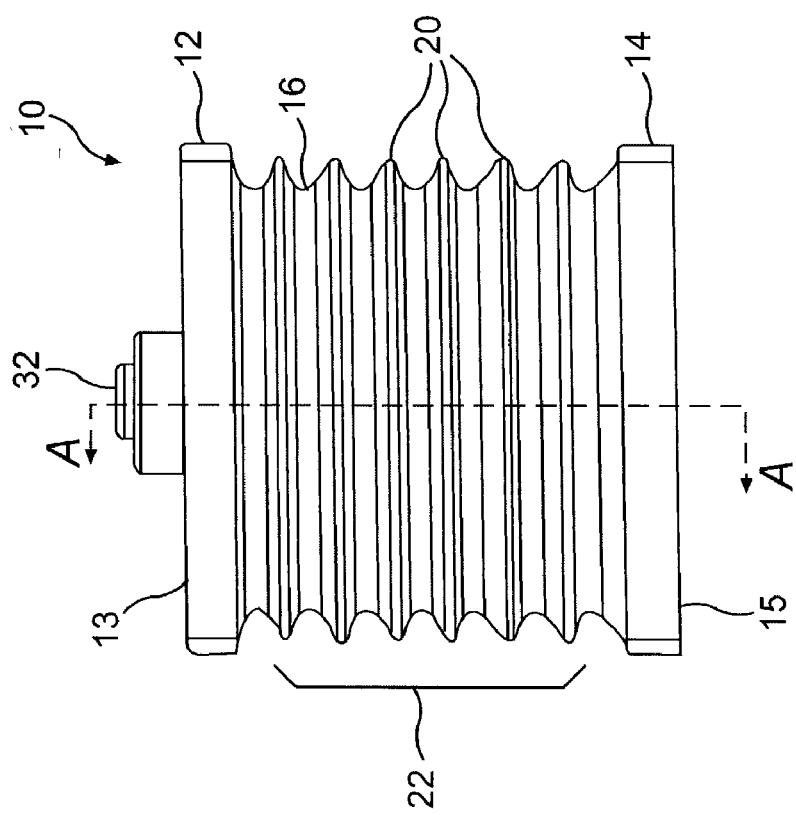
FIG. 1a is a side view of an exemplary embodiment of a resilient mount in accordance with the invention.
Figure 1B:
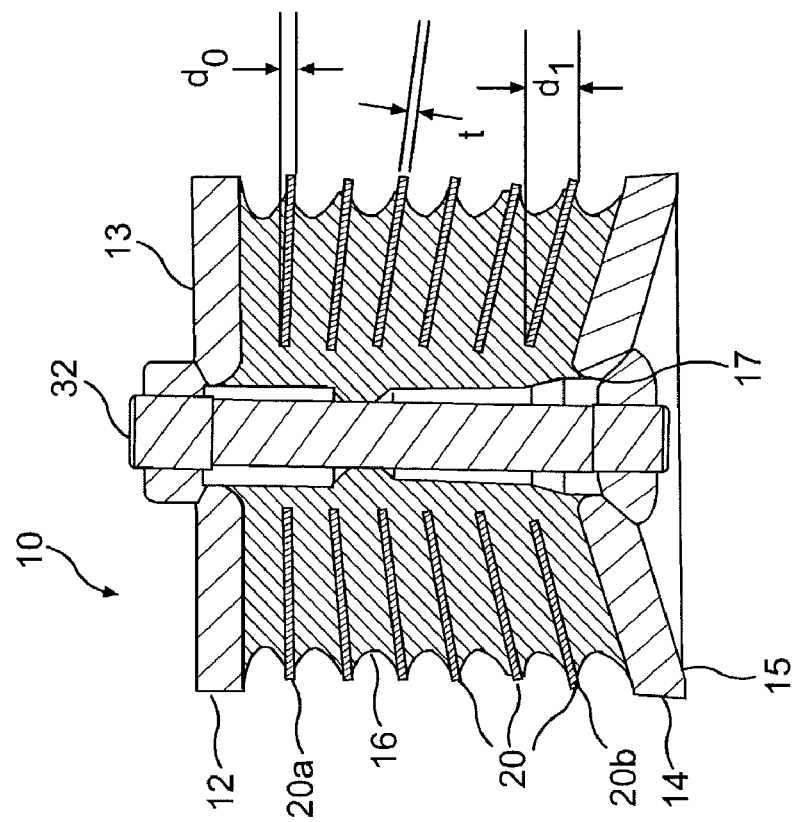

FIGS. 1a and 1b are illustrations of an exemplary embodiment of a resilient mount 10 in accordance with the present invention. Resilient mount 10 includes a first mounting member 12 and a second mounting member 14. A resilient material 16 is provided between first and second mounting members 12, 14, and a plurality 22 of stiffening elements 20 are embedded in the resilient material 16. Resilient mount 10 would typically be positioned between two machine or vehicle components (not shown).

Both first mounting member 12 and second mounting member 14 may be flat plates having square, rectangular, circular, or other regular or irregular-shaped perimeters. Alternatively, one or both of first and second mounting members 12, 14 may be non-planar, for example, concave, as best shown by second mounting member 14 in FIG. 1b, convex, or other regular or irregular non-planar shapes. First and second mounting members may be provided with a central through hole 17.

Additionally, first and second mounting members 12, 14 are adapted to attach to the vehicle components between which resilient mount 10 is positioned. First mounting member 12 may have a mounting surface 13 complementing a mounting surface of the corresponding vehicle component (not shown) and second mounting member 14 may have a mounting surface 15 complementing a mounting surface of the other vehicle component (also not shown). For example, first mounting member 12 may have a square perimeter with a bolt hole at each corner for attachment to the corresponding vehicle component. Other attachment methods known to persons of ordinary skill in the art may be used.

Resilient material 16 is positioned between first and second mounting members 12, 14. Material 16 is formed from any suitable resilient material, for instance, an elastomeric material. Such materials typically bulge when subjected to compressive loads and neck down when subjected to tension loads. Resilient material 16 may be molded to, bonded with an adhesive to, or otherwise attached to first and second mounting members 12, 14 in order to more efficiently transmit loads between these mounting members 12, 14.

In addition, resilient material 16 may be molded to, bonded with an adhesive to, or otherwise attached to the plurality 22 of stiffening elements 20. Resilient material 16 may be formed from a single piece of elastomeric material, as best shown in FIG. 1b. As shown, resilient material 16 may be, for example, molded around, or partially molded around, stiffening elements 20. Alternatively, resilient material 16 may form a plurality of pieces 16a, which are inserted between, and molded or bonded to, the plurality of stiffening elements 20, as best shown in FIG. 2b.

Figure 3A:
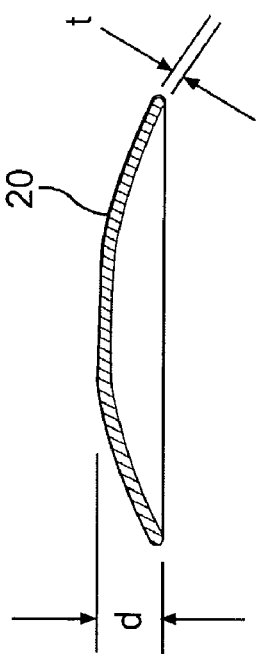
FIGS. 3a–3e are cross-sectional side views of exemplary configurations of a stiffening element in accordance with the invention.

As shown in FIGS. 1a and 1b, a plurality 22 of stiffening elements 20 is positioned between first and second mounting members 12, 14. Stiffening elements 20 are stacked one-on-top-another, spaced apart, and with a layer of resilient material 16 located between them. Each stiffening element 20 is formed from a thin plate having a plate thickness t. Plate thickness t need not be uniform. For example, as shown in FIG. 3a, plate thickness t could vary from one thickness $t_0$ at the perimeter of stiffening element 20 to a second thickness $t_1$ closer to the center of the stiffening element 20. Stiffening elements 20 may have a circular perimeter, but other perimeter shapes, such as square, rectangular, oval, or other shapes, could be used to assist in the more efficient reaction of loads transmitted by resilient mount 10. Moreover, each stiffening element 20 in the plurality 22 need not have the same perimeter shape, nor need each stiffening element 20 in the plurality 22 be of the same size.

As best shown in FIGS. 1b, 2b, and 3a–3e, stiffening elements 20 may be non-planar, i.e., stiffening elements 20 may have an out-of-plane dimension d that is greater than the plate or material thickness t. As shown in FIG. 1b, the out-of-plane dimension d need not be the same for each of the plurality 22 of stiffening elements 20 in any one resilient mount 10. For example, the out-of-plane dimension d may vary as the stack of stiffening elements 20 is traversed, from a minimum out-of-plane dimension $d_0$ for a first stiffening element 20a at one end of the stack of stiffening elements 20 to a maximum out-of-plane dimension $d_1$ for a last stiffening element 20b at the opposite end of the stack. As another example, as shown in FIG. 2b, the out-of-plane dimension d may vary from a minimum out-of-plane dimension $d_0$ for a stiffening element 20a near the center of the stack of stiffening elements 20 to a maximum out-of-plane dimension $d_1$ for stiffening elements 20b at either end of the stack of stiffening elements 20. Other arrangements of stiffening elements 20, with their associated out-of-plane dimensions d, may be provided, for example, to alter the load-carrying capacity or stiffness of resilient mount 10.

Also as shown in FIG. 2b, one or more of the stiffening elements 20 may be planar, i.e., the out-of-plane dimension d may be substantially the same as the plate thickness t. In FIG. 2b, the central stiffening element 20c is planar. A first plurality 22a of stiffening elements 20 is arranged on one side of central stiffening element 20c and a second plurality of stiffening elements 22b is arranged on the other side of this central, planar, stiffening element 20c.

Figure 3B:
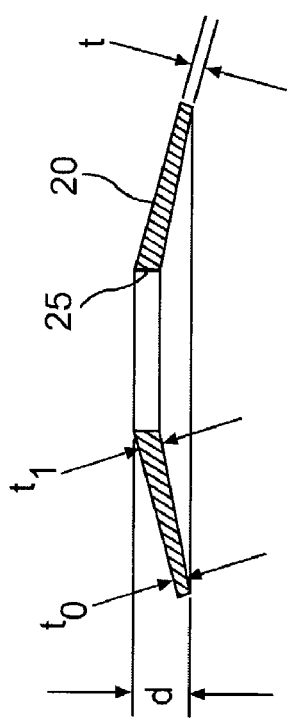
Figure 3C:
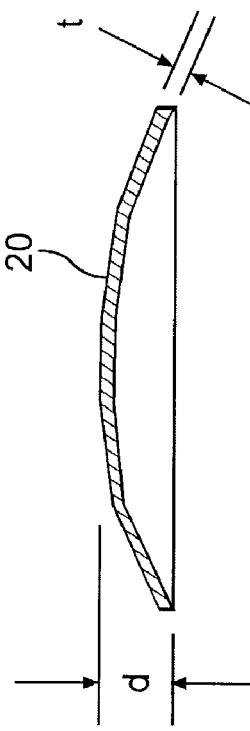
Figure 3D:
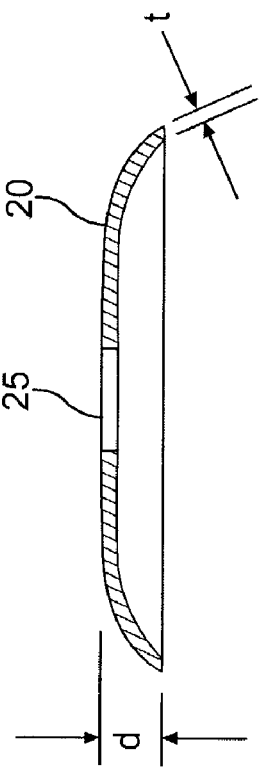
Figure 3E:
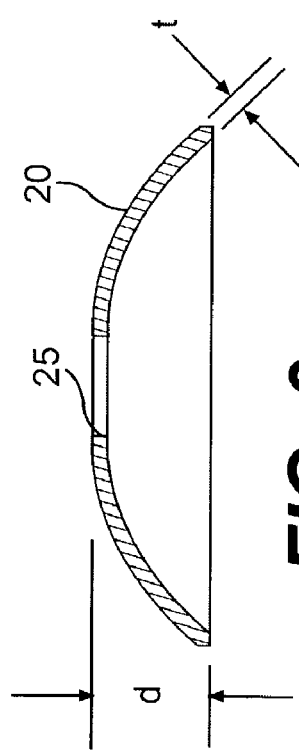

As best shown in FIGS. 3a–3e, non-planar stiffening elements 20 may have any of a variety of cross-sections. For instance, FIG. 3a illustrates a stiffening element 20 having a conical shape, i.e., having a "vee"-type cross-section. In this particular example, stiffening element 20 has a truncated conicaltype shape with a central through hole 25. In addition, the element of FIG. 3a has a plate thickness t that is greater towards the center than towards the edge. FIG. 3b illustrates a stiffening element 20 having a spherical shape, i.e., having a circular-type cross-section. In other words, the plate forming the stiffening element has a constant radius of curvature. In this particular example, the plate thickness t is substantially constant and the element has no central through hole. FIG. 3c illustrates a stiffening element 20 having a parabolic-type cross-section, i.e., the plate curvature is greater in the center than at the edges and the plate roughly follows a parabolic-type curvature. As in FIG. 3b, the plate thickness t is substantially constant, and as in FIG. 3a, the stiffening element has a central through hole 25. FIG. 3d illustrates a stiffening element 20 having an elliptical-type cross-section, i.e., the plate forming the stiffening element has a radius of curvature greater at the perimeter than in the towards the center and the plate roughly follows an elliptical-type curvature. Again, as in FIGS. 3b and 3c, the plate thickness t is substantially constant. As in FIGS. 3a and 3c, the element has a central through hole 25. FIG. 3e illustrates a stiffening element 20 having a polygonal-type cross-section, i.e., the plate cross-section is formed from a series of substantially straight line segments. Other cross-sectional shapes, whether regular or irregular, are considered to be within the scope of the invention. For instance, a stiffening element 20 may have a substantially flat cross-section in one direction and a spherical-type cross-section in a second direction, orthogonal to the first, i.e., a barrel-shaped element may be formed.

Moreover, resilient mount 10 may include at least one stiffening element 20 which is non-parallel to a second stiffening element 20. As shown in FIG. 1b, stiffening element 20a has a relatively flat profile, while stiffening element 20b has a cross-section profile angle of inclination that lies approximately 15 to 20 degrees from the horizontal. The cross-section profiles of the stiffening elements 20 stacked in between elements 20a and 20b have angles of inclination that increase as the plurality of stiffening elements 20 is traversed from element 20a to element 20b. Thus, in the embodiment of FIG. 1b, all of the stiffening elements are non-parallel to each other. Similarly, in the embodiment shown in FIGS. 2a and 2b, wherein stiffening elements 20 have a circular-type cross-section, the radius of curvature varies from element to element. The first plurality 22a of stiffening elements 20 are non-parallel to one another; the second plurality 22b of stiffening elements 20 are non-parallel to one another and also to the stiffening elements within the first plurality 22a. Furthermore, the middle, planar, stiffening element 20c is non-parallel to all of the other stiffening elements 20. Thus, here again, the stiffening elements are non-parallel to one another. Other arrangements of non-parallel stiffening elements are also considered to be within the scope of the invention.

Moreover, resilient mount 10 could have a combination of non-parallel stiffening elements and parallel stiffening elements. For instance, an alternative embodiment to that shown in FIG. 2b could be to include second or third planar stiffening elements 20c located adjacent the single middle, planar, stiffening element 20c already shown in FIG. 2b. All of the planar stiffening elements 20c being parallel to one another; all of the other stiffening elements, i.e., stiffening elements 20a, 20b, etc., being non-parallel to one another. Alternatively, every stiffening element 20 within the embodiments shown in FIGS. 1b and 2b could be paired with a duplicate, parallel stiffening element. Thus, for example, a pair of parallel stiffening elements 20b could be located adjacent to a pair of parallel stiffening elements 20a, with stiffening element 20b being non-parallel to stiffening element 20a.

A tension-carrying element 32, such as a central through bolt having nuts at one or both ends, as best shown in FIGS. 1b and 2b, may be used to control the maximum amount of separation between the first and second mounting members 12, 14. Tension-carrying element 32 would typically carry tension loads, i.e., loads acting to move first mounting member 12 away from second mounting member 14 and to thereby stretch resilient material 16. Although tension-carrying element 32 would typically not carry compression loads i.e., loads acting to move first mounting member 12 toward second mounting member 14 thereby compressing resilient material 16, in certain applications, member 32 may carry compression loads. Additionally, tension-carrying element 32 may be preloaded. Alternatively, more than one tension-carrying element 32 may be used and these elements need not be located in the center. For example, a pair of tension-carrying elements 32 (not shown) may be placed at opposite edges or corners of first and second mounting members 12, 14.

INDUSTRIAL APPLICABILITY

While the load-bearing resilient mount of FIGS. 1 and 2 has a wide variety of uses, the described mount may be especially well suited for use with an articulated vehicle. For example, this load-bearing resilient mount could be used for the rear suspension of an articulated dump truck. In an articulated dump truck, the rear suspension transmits very high loads from the frame into the rear axles. In an articulated dump truck having two rear axles, for example, equalizing beams could transfer the weight of the payload through four resilient mounts, two per equalizing beam, to the rear axles. The resilient mounts would typically be mounted at the ends of the equalizing beams and would allow independent motion of the axles. At the same time as the rear suspension carries these large loads, it undergoes large oscillations or deflections while maintaining traction in rough terrain. In these situations, the load-bearing resilient mount would carry high compressive and tensile loads while its mounting surfaces translate and tilt relative to each other.

For those situations where a single resilient mount may not have the desired load-carrying capacity, a pair of resilient mounts could be mounted side-by-side in a parallel load-carrying configuration.

It will be readily apparent to those skilled in this art that various changes and modifications of an obvious nature may be made to the disclosed invention, and all such changes and modifications are considered to fall within the scope of the appended claims. Other embodiments of the invention will be apparent to those skilled in the art from consideration of the specification and practice of the invention disclosed herein. It is intended that the specification and examples be considered as exemplary only, with a true scope of the invention being indicated by the following claims and their equivalents.

What is claimed is:

1. A resilient mount, comprising:
   a first mounting member;
   a second mounting member;
   a first plurality of stiffening elements located between the first and second mounting members, at least a first stiffening element of the first plurality of stiffening elements being non-parallel to a second stiffening element of the first plurality of stiffening elements and each of the first plurality of stiffening elements having a material thickness and an out-of-plane dimension, which is greater than the material thickness;
   a resilient material located between and coupled to adjacent stiffening elements of the first plurality of stiffening elements;
   a second plurality of stiffening elements located between the first and second mounting members, each stiffening element of the second plurality of stiffening elements having a material thickness and an out-of-plane dimension which is greater than the material thickness; and
   a resilient material located between and coupled to adjacent stiffening elements of the second plurality of stiffening elements,
   wherein the first plurality of stiffening elements are arranged in order of increasing out-of-plane dimension, and the second plurality of stiffening elements are arranged in order of decreasing out-of-plane dimension.

2. The mount of claim 1, wherein at least one stiffening element of the first or second plurality of stiffening elements has one of a vee-type cross-section, a circular-type cross-section, a parabolic-type cross-section, an elliptical-type cross-section, or a polygonal-type cross-section.

3. The mount of claim 1, further including:
   at least one planar stiffening element located between the first plurality of stiffening elements and the second plurality of stiffening elements.

4. The mount of claim 3, further including a tension-carrying element extending between the first and second mounting members.

5. A resilient mount comprising:
   a first mounting member;
   a second mounting member;
   a resilient material coupled to the first and second mounting members; and
   a first plurality of non-planar elements, each non-planar element at least partially embedded in the resilient material and having an out-of-plane dimension, and at least a first of the non-planar elements being non-parallel to a second of the non-planar elements; and
   a second plurality of non-planar elements, each non-planar element of the second plurality of non-planar elements at least partially embedded in the resilient material and having an out-of-plane dimension, wherein the first plurality of non-planar elements are arranged in order of increasing out-of-plane dimension, and the second plurality of non-planar elements are arranged in order of decreasing out-of-plane dimension.

6. The mount of claim 5, wherein at least one non-planar element of the first or second plurality of non-planar elements has one of a vee-type cross-section, a circular-type cross-section, a parabolic-type cross-section, an elliptical-type cross-section, or a polygonal-type cross-section.

7. The mount of claim 5, further including a tension element extending between the first and second mounting members and limiting relative movement of the first mounting member away from the second mounting member.

8. The mount of claim 5, further including:
   at least one planar element located between the first plurality of non-planar elements and the second plurality of non-planar elements.

* * * * *